Figure 3:
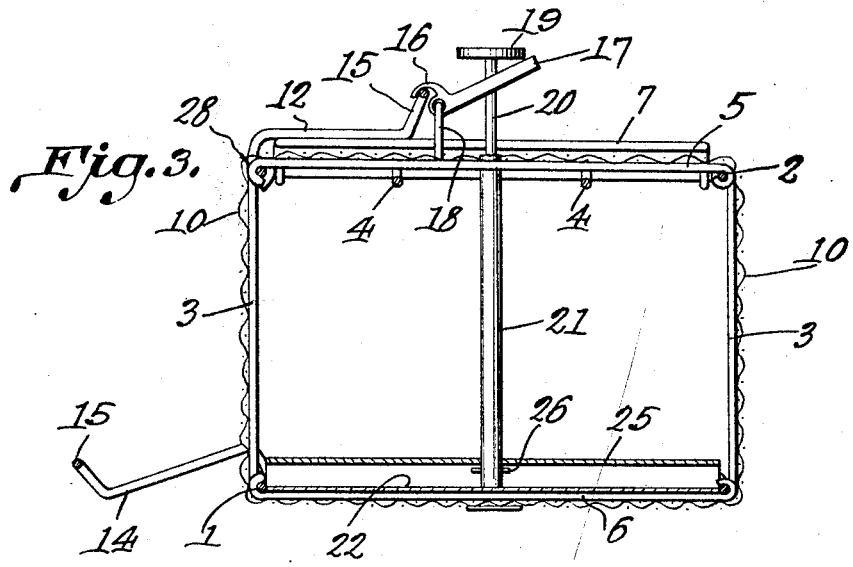

March 2, 1926.
A. G. SPARKS
FOWL AND ANIMAL TRAP
Filed Oct. 21 1925
1,575,456
2 Sheets-Sheet 1
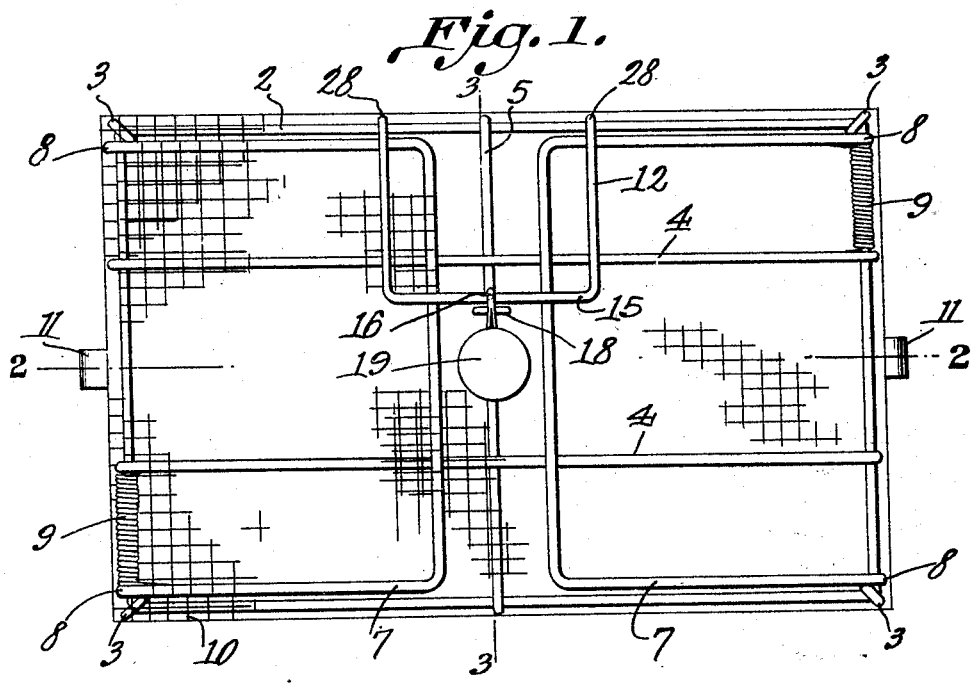
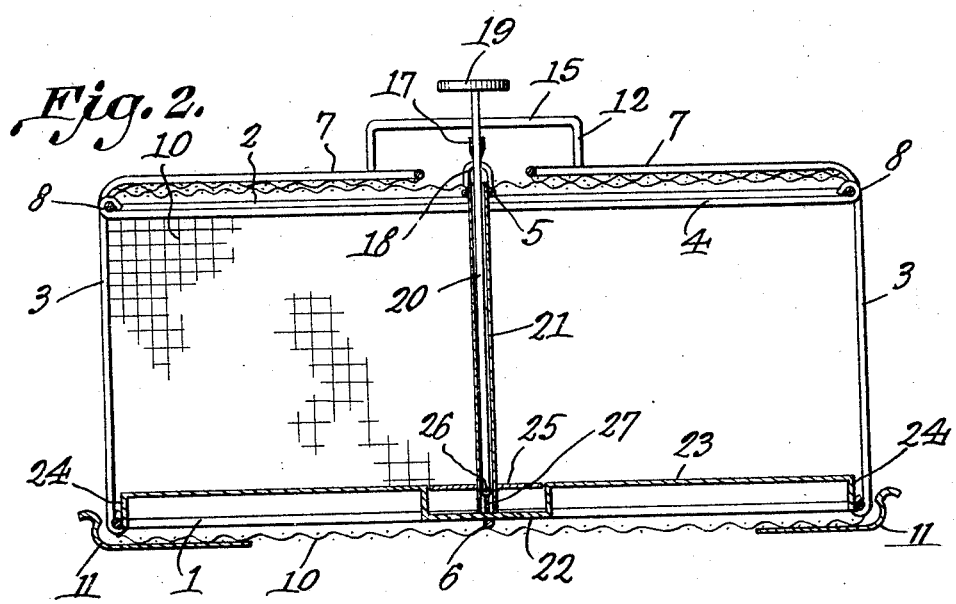
Abe G. Sparks Inventor
By C.A.Snow & Co.
Attorneys March 2, 1926.  1,575,456
A. G. SPARKS
FOWL AND ANIMAL TRAP
Filed Oct. 21, 1925  2 Sheets-Sheet 2

Abe G. Sparks Inventor
By C.A.Snow & Co.
Attorneys

Patented Mar. 2, 1926.

1,575,456

UNITED STATES PATENT OFFICE.

ABRAM GREEN SPARKS, OF BOONEVILLE, MISSISSIPPI.

FOWL AND ANIMAL TRAP.

Application filed October 21, 1925. Serial No. 63,925.

*To all whom it may concern:*

Be it known that I, ABRAM G. SPARKS, a citizen of the United States, residing at Booneville, in the county of Prentiss and State of Mississippi, have invented a new and useful Fowl and Animal Trap, of which the following is a specification.

The device forming the subject matter of this application is an animal trap having movable doors, and the invention aims to provide novel means for controlling the movement of the doors.

It is within the province of the disclosure to improve generally and to enhance the utility of devices of that type to which the invention appertains.

With the above and other objects in view which will appear as the description proceeds, the invention resides in the combination and arrangement of parts and in the details of construction hereinafter described and claimed, it being understood that changes in the precise embodiment of the invention herein disclosed, may be made within the scope of what is claimed, without departing from the spirit of the invention.

In the drawings:—

Figure 4:
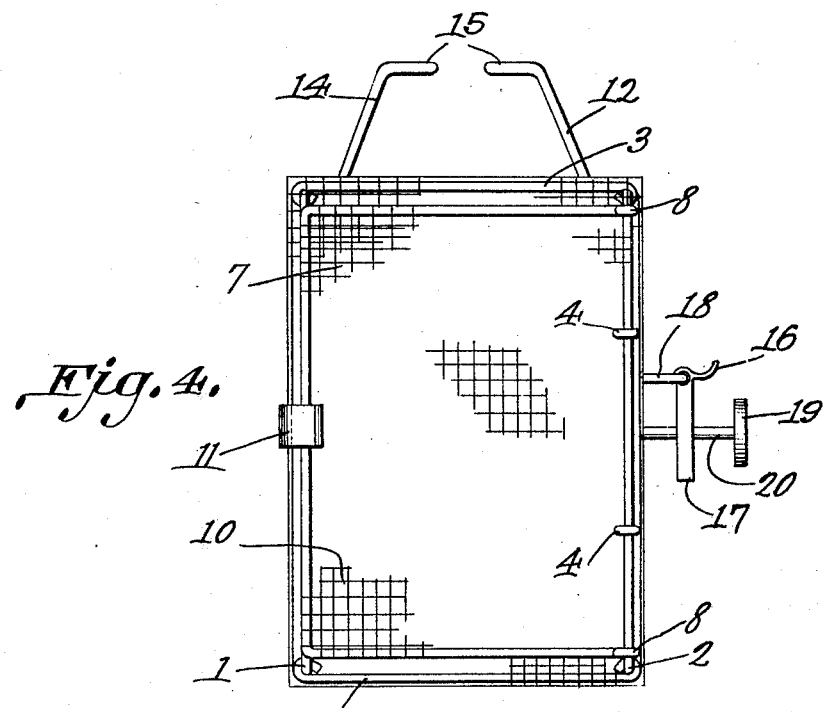

Figure 1 shows in top plan, a device constructed in accordance with the invention, the trap being set, the handles being folded beneath the trap; Figure 2 is a longitudinal section on the line 2—2 of Fig. 1, parts being in elevation; Figure 3 is a transverse section on the line 3—3 of Fig. 1, parts being in elevation; Figure 4 is an end elevation showing the trap as it will appear whilst it is being carried in the hand.

The trap forming the subject matter of this application comprises a box-like casing which may be made in various ways, the casing, if desired, embodying a lower rectangular frame 1 and an upper rectangular frame 2 connected at their corners by vertical posts 3. Intermediate longitudinal bars 4 extend between the ends of the upper frame 2. The sides of the upper frame 2 are connected by an intermediate transverse bar 5. The sides of the lower rectangular frame 1 are connected by a lower transverse bar 6. Doors 7 are hinged at 8 to the ends of the upper frame 2 and are mounted to swing vertically. Coiled springs 9 are mounted on the ends of the upper frame 2 and are engaged with the doors 7 to swing them downwardly into closed positions.

The casing of the trap may consist wholly or in part of netting 10, if desired, and the doors 7 may also embody netting. When the doors are closed, they are engaged at their lower edges by resilient latches 11 mounted on the bottom of the trap casing.

Bail-shaped handles 12 and 14 are provided and are hingedly mounted as at 28 on the side portions of the upper frame 2. The handle 12 may be denominated a latch, because it has functions which will be brought out hereinafter. The handles 12 and 14 have offset ends or grips 15. The part 15 of the bail or latch 12 is adapted to be engaged by a hook-shaped finger 16 on a trigger 17 fulcrumed intermediate its ends on a bracket 18 carried by the upper transverse bar 5, the trigger 17 extending transversely of the trap and being disposed above the top of the trap. The trigger 17 extends beneath a head 19 mounted on the upper end of a plunger 20 which moves vertically in a guide tube 21. The upper portion of the guide tube 21 is mounted in the transverse bar 5, as shown in Figure 2. The lower end of the guide tube 21 is mounted on the centrally depressed portion 22 of a platform 23 provided at its ends with depending flanges 24 connected to the ends of the lower frame, the depressed portion 22 of the platform 23 being supported by the lower transverse bar 6. In the centrally depressed portion 22 of the platform 23, a tread plate 25 is located, the guide tube 21 extending downwardly through the tread plate, and the tread plate being vertically movable on the guide tube. The plunger 20 is provided at its lower end with a cross pin 26 mounted to move vertically in slots 27 formed in the lower end of the guide tube 21, the cross pin being disposed below the tread plate 25.

In practical operation, the doors 7 are swung open and backwardly upon the top of the trap, the latch 12 being swung over on top of the inner ends of the doors 7, and the part 15 of the latch 12 being engaged with the finger 16 on the trigger 17, the trigger 17 being located below the head 19 on the plunger 20, the plunger 20 being raised in the guide tube 21, and the tread plate 25 being raised in the centrally depressed portion 22 of the platform 23. An animal, entering the trap from either end, passes over the tread plate 25 and carries the tread plate 25 downwardly in the part 22 of the platform 23, the tread plate coacting with the cross pin 26 to draw the plunger 20 downwardly, and when the plunger is drawn downwardly, the head 19 of the plunger, cooperating with the trigger 19, will tilt the trigger on the bracket 18, the finger 16 being disengaged from the part 15 of the latch 12. Thereupon, the springs 9 will react to close the doors 17 into engagement with the latches 11, the member 12 swinging free from the doors 7, as they close. The trap may be set up on one edge, as shown in Figure 4, and, then, the trap 12 and the corresponding handle 14 may be swung into position above the trap, the grips 15 extending inwardly, toward each other, so that they may be engaged readily in one hand of the operator, when the trap is to be carried about.

What is claimed is:—

1. A trap comprising a casing, a plunger mounted for vertical movement in the casing intermediate the ends thereof, a tread plate cooperating with the plunger, a head on the plunger, a trigger fulcrumed intermediate its ends on the top of the trap and extended beneath the head, spring-closed doors hinged to the trap and adapted to be opened upon the top of the trap, and a latch hinged to the casing and overhanging the door when the door is opened, the latch being engaged by the trigger.

2. A trap comprising a casing, a guide tube supported in the casing, a tread plate slidable on the guide tube, a plunger slidable in the guide tube, means for connecting the plunger with the tread plate, a trigger fulcrumed on the top of the casing and extended at one end beneath a part of the plunger, a spring closed door hinged to the casing and adapted to be opened on top of the casing, and a latch hinged to the casing and adapted to overlie the door when the door is open, the latch being engaged with the trigger.

3. A trap comprising a casing, a platform in the casing and provided with a depressed portion, a tube extended into the depressed portion of the platform, a tread plate slidable in the depressed portion of the platform and on the guide-tube, a plunger slidable in the guide tube, means for connecting the plunger with the tread plate, a trigger fulcrumed intermediate its ends on the top of the casing, means for operating the trigger at one end from the plunger, a spring-closed door hinged on the casing, and adapted to be swung open on top of the casing, and a latch hinged to the casing and adapted to overhang the door when the door is open, the latch being engageable with the other end of the trigger.

In testimony that I claim the foregoing as my own, I have hereto affixed my signature.

ABRAM GREEN SPARKS.